US008832544B2

(12) United States Patent
Vigesaa et al.

(10) Patent No.: US 8,832,544 B2
(45) Date of Patent: *Sep. 9, 2014

(54) ASSOCIATING CONDITIONS TO SUMMARY TABLE DATA

(75) Inventors: Eric B. Vigesaa, Seattle, WA (US); Allan Folting, Redmond, WA (US); Bruce Cordell Jones, Bellevue, WA (US); Robert C. Collie, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 398 days.

This patent is subject to a terminal disclaimer.

(21) Appl. No.: 12/857,067

(22) Filed: Aug. 16, 2010

(65) Prior Publication Data
US 2011/0035653 A1    Feb. 10, 2011

Related U.S. Application Data

(63) Continuation of application No. 11/215,634, filed on Aug. 29, 2005, now Pat. No. 7,779,000.

(51) Int. Cl.
*G06F 17/30* (2006.01)
*G06F 17/00* (2006.01)
*G06F 17/24* (2006.01)

(52) U.S. Cl.
CPC ........ *G06F 17/30489* (2013.01); *G06F 17/246* (2013.01)
USPC .......................................... 715/217; 707/722

(58) Field of Classification Search
USPC ................................... 715/212, 217; 707/722
See application file for complete search history.

(56) References Cited

U.S. PATENT DOCUMENTS

| 6,349,315 | B1 | 2/2002 | Sonoyama et al. |
| 6,851,088 | B1 | 2/2005 | Conner et al. |
| 7,082,569 | B2* | 7/2006 | Voshell .......................... 715/212 |
| 7,275,207 | B2* | 9/2007 | Aureglia et al. .............. 715/214 |
| 7,676,738 | B2* | 3/2010 | Hoffmann et al. ............ 715/213 |
| 7,779,000 | B2 | 8/2010 | Vigesaa et al. |
| 2003/0051209 | A1* | 3/2003 | Androski et al. ............. 715/503 |
| 2004/0088650 | A1 | 5/2004 | Killen et al. |
| 2006/0005112 | A1 | 1/2006 | Lilly et al. |

* cited by examiner

*Primary Examiner* — Hung T Vy
(74) *Attorney, Agent, or Firm* — Jim Ross; Brian Haslam; Micky Minhas

(57) ABSTRACT

A method and system associate conditional formats with selected data points or groups of data points within a summary table. In one embodiment, related groups of data are determined based upon currently highlighted cells in a summary table. A user then selects from the groups and identifies conditional formats to be associated with the specified data points. The conditional formats are associated with currently displayed as well as non-displayed data within the summary table. The associated conditions are saved relative to the data points rather than the original cell positions so that the conditions remain associated with the data points following a reorganization of the summary table.

18 Claims, 8 Drawing Sheets

| Profit | | | Year | ▼ Quarter | | | |
|---|---|---|---|---|---|---|---|
| | | | 1997 | | | | 1997 Total |
| Country ▼ | State Province | City | Q1 | Q2 | Q3 | | |
| USA | CA | | 21744.1149 | 23064.7336 | 23721.2244 | | 68530.0729 |
| | OR | Albany | 2708.4425 | 1519.8874 | 2454.9689 | | 6683.2988 |
| | | Beaverton | 1457.6106 | 1731.2485 | 1061.4575 | | 4250.3166 |
| | | Corvallis | 3413.8818 | 2396.8349 | 3615.0815 | | 9425.7982 |
| | OR Total | | 7579.9349 | 5647.9708 | 131.5079 | | 20359.4136 |
| | WA | Anacortes | 249.1777 | 256.2898 | 249.0486 | | 754.5161 |
| | | Ballard | 846.5369 | 845.4753 | 755.6285 | | 2447.6407 |
| | | Bellingham | 199.9381 | 176.4671 | 228.9258 | | 605.331 |
| | WA Total | | 1295.6527 | 1278.2322 | 1233.6029 | | 3807.4878 |
| USA Total | | | 30619.7025 | 29990.9366 | 32086.3352 | | 92696.9743 |
| Grand Total | | | 30619.7025 | 29990.9366 | 32086.3352 | | 92696.9743 |

FIG. 5A

| Profit | | | Year | ▼ Quarter | | |
|---|---|---|---|---|---|---|
| | | | 1997 | | | 1997 Total |
| Country ▼ | State Province | City | Q1 | Q2 | Q3 | |
| USA | CA | | 21744.1149 | 23064.7336 | 23721.2244 | 68530.0729 |
| | OR | Albany | 2708.4425 | 1519.8874 | 2454.9689 | 6683.2988 |
| | | Beaverton | 1457.6106 | 1731.2485 | 1061.4575 | 4250.3166 |
| | | Corvallis | 3413.8818 | 2396.8349 | 3615.0815 | 9425.7982 |
| | OR Total | | 7579.9349 | 5647.9708 | 1.5079 | 20359.4136 |
| | WA | Anacortes | 249.177 | 256.2898 | | |
| | | Ballard | 846.5369 | 845.4753 | | |
| | | Bellingham | 199.9361 | 176.4671 | | |
| | WA Total | | 1295.6527 | 1278.2322 | | |
| USA Total | | | 30619.7025 | 29990.9366 | | |
| Grand Total | | | 30619.7025 | 29990.9366 | | |

Apply formatting rule to...
⦿ Just these cells
○ All "Profit" cells
○ All "Profit" cells with the same fields

| Profit | | | Year ▼ | Quarter | | |
|---|---|---|---|---|---|---|
| | | | 1997 | | | 1997 Total |
| Country ▼ | State Province | City | Q1 | Q2 | Q3 | |
| USA | CA | | 21744.1149 | 23064.7336 | 23721.2244 | 68530.0729 |
| | OR | Albany | 2708.4425 | 1519.8874 | 2454.9689 | 6683.2988 |
| | | Beaverton | 1457.6106 | 1731.2485 | 1061.4575 | 4250.3166 |
| | | Corvallis | 3413.8818 | 2396.8349 | 3615.0815 | 9425.7982 |
| | OR Total | | 7579.9349 | 5647.9708 | 7131.5079 | 20359.4136 |
| | WA | Anacortes | 249.1777 | 256.2898 | 249.0486 | 754.5161 |
| | | Ballard | 846.5369 | 845.4753 | 755.6285 | 2447.6407 |
| | | Bellingham | 199.9381 | 176.4671 | 228.9258 | 605.331 |
| | WA Total | | 1295.6527 | 1278.2322 | 1233.6029 | 3807.4878 |
| USA Total | | | 30619.7025 | 29990.9366 | 32086.3352 | 92696.9743 |
| Grand Total | | | 30619.7025 | 29990.9366 | 32086.3352 | 92696.9743 |

ASSOCIATING CONDITIONS TO SUMMARY TABLE DATA

CROSS REFERENCE TO RELATED APPLICATIONS

This application is a continuation application of U.S. Pat. No. 7,779,000 filed Aug. 29, 2005, entitled "ASSOCIATING CONDITIONS TO SUMMARY TABLE DATA", which is hereby incorporated in its entirety.

BACKGROUND

Summary tables are interactive worksheet tables used to summarize and analyze data from existing, and perhaps large, tables, databases or OLAP cubes. A user can manipulate the rows and columns in a summary table to view or summarize information in different ways or for different purposes of analysis. The data in the summary tables moves and changes as the summary table is manipulated. Problems arise when a user wants to highlight or conditionally format particular data within the summary table, such as the top ten percent of values, or values above a certain threshold.

When a conditionally-formatted summary table having highlighted data is manipulated, the originally highlighted data may be moved to a different location within the summary table, while the static highlighting remains with the particular cells where it was originally defined and applied. This may cause confusion as different data is now being highlighted in the original cells. It is with respect to these and other considerations that the present invention has been made.

SUMMARY

Exemplary embodiments disclosed herein relate to a method and system for associating conditions with data points in a summary table, such that when the summary table is manipulated and the data points are moved, the conditions will still be applied to the same data points at their new locations.

Other embodiments include a method for associating conditions with related data points based upon the different fields that intersect with the active data point. Furthermore, a user may be able to select from the different groups of related data points to apply conditional formatting.

A system and methods described herein may be implemented as a computer process, a computing system, or as an article of manufacture, such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

FIG. 5A illustrates operational characteristics involved in selecting one or more cells, according to an exemplary embodiment.

FIG. 5B illustrates operational characteristics involved in presenting the user with different related groups of data points, according to an exemplary embodiment.

FIG. 5C illustrates operational characteristics involved in identifying the selected related data points, according to an exemplary embodiment.

DETAILED DESCRIPTION

Figure 1:
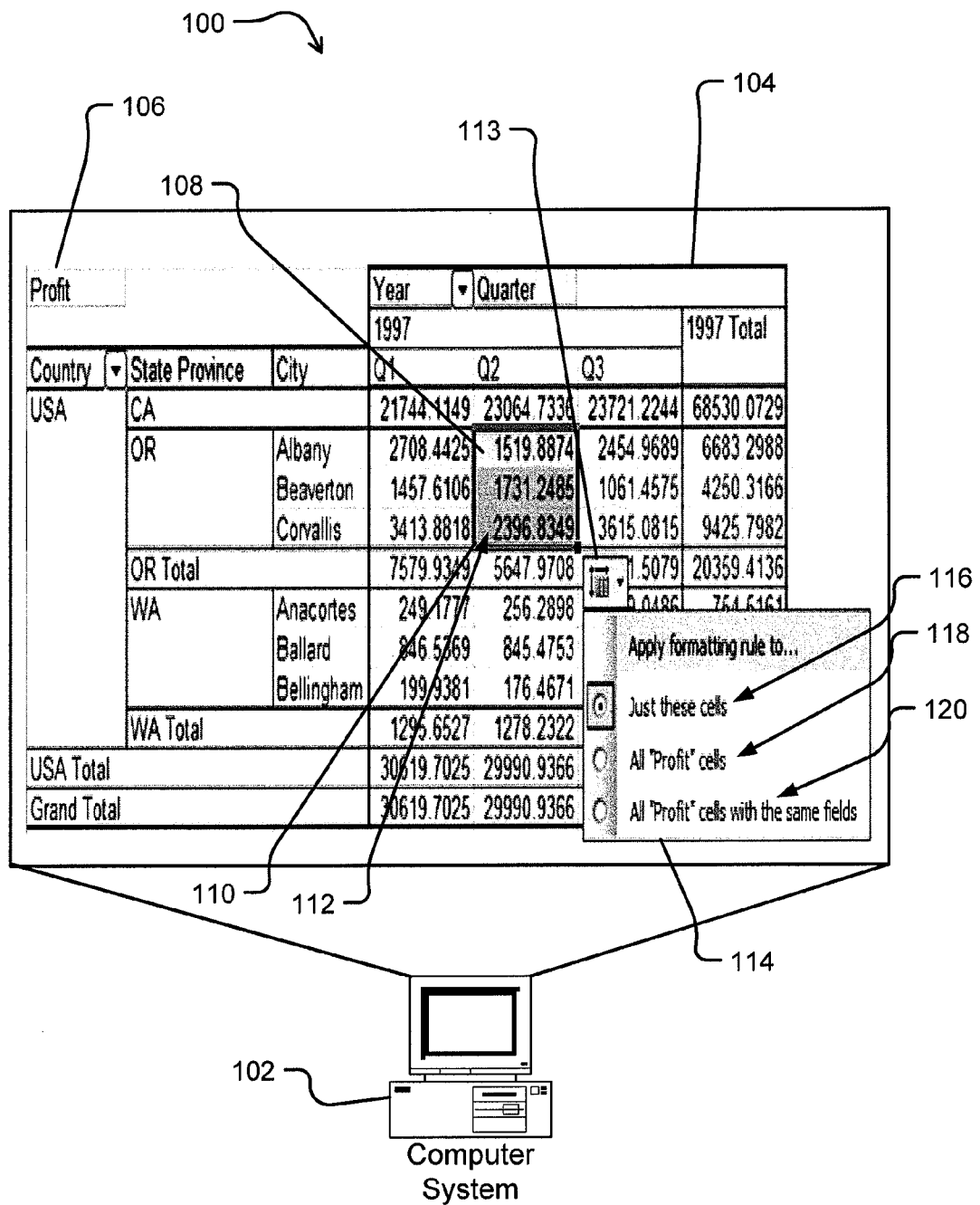
FIG. 1 illustrates a system for conditional formatting a summary table, according to an exemplary embodiment.

A system for applying conditions to data points within a summary table is shown in FIG. 1, generally at 100. System 100 in one embodiment includes a computer system 102 which, in turn, includes a summary table 104. Summary tables are interactive worksheet tables used to summarize and analyze data from existing and perhaps large tables, databases, OLAP cubes and/or other data stores. A user can manipulate the rows and columns in a summary table to view or summarize information in different ways or for different analysis purposes. The data in summary tables may move and change as the user rearranges the summary table accordingly.

Summary table 104 includes a data field 106. As shown in this particular embodiment, the data field 106 contains profit values, arranged in this instance by country, state and city, as well as by year and quarter as shown. It will be appreciated that many different configurations of fields on the row and column axes of the summary table may be utilized depending on the needs of the user. Furthermore, the fields and data points may be continuously reorganized by manipulating the fields within a summary table.

A plurality of selected cells are shown at 108. There may be many different ways for selecting cells, including clicking, double clicking, clicking and dragging, using keyboard arrow keys, etc. Selected cells 108 are indicated by border 110, as well as by shading. It will be appreciated that one or more cells may be selected, and that the selected cells may include one or more data points 112, as desired. A user may then apply a conditional format to the selected cells, such as applying a yellow highlight to positive values that are less than a predetermined number.

In one embodiment, once the cells have been selected and a conditional format applied, a user may click on an icon 113 to open a related data selection interface 114. This interface displays the different types of related data that may be included within the scope of the conditional format applied to the selected data points. In the embodiment shown in FIG. 1, there are three "scoping" options used to determine the set of data points to be associated with the condition. The first option 116 simply associates a condition to only the selected cells. A second option 118 associates the condition to all profit cells, meaning every profit cell within the summary table. The third option 120 associates the condition to all profit cells where the same set of fields intersect as in an "active cell." As used herein, the term "active cell" refers to a selected cell when only a single cell is selected. In cases where multiple cells are selected, the top-left cell of the selected cells is determined to be the "active cell." In the example of FIG. 1, the active cell is the top selected cell, and the set of intersecting fields includes: Profit, Country, State_Province, City, Year, and Quarter.

Conditional formats that could be associated to the selected cells include highlighting cells with a value greater than a certain number, less than a certain number, within the top ten percent of all values in a defined region, within the bottom ten percent, etc. Utilizing the present invention, conditions may be associated to an explicit set of data points, all data points for a particular data field, or all data points where a particular set of fields intersect, depending on the scoping option chosen by the user. This information may then be saved to a summary table cache such that, when the summary table is rearranged, or more or different data is displayed, the condition is re-applied to these data points at their new locations in the summary table. A condition's scoping information may be saved via coordinates from a linked spreadsheet, database, and/or data source.

It will also be appreciated that these conditions and associated scoping information can be saved such that every time the summary table is viewed the conditions remain associated with the data points included in the condition's scope, regardless of whether these data points are currently hidden due to a manipulation of the summary table (in which case the formatting will also be hidden), or whether the data points are displayed (in which case the formatting will also be displayed).

Figure 2:
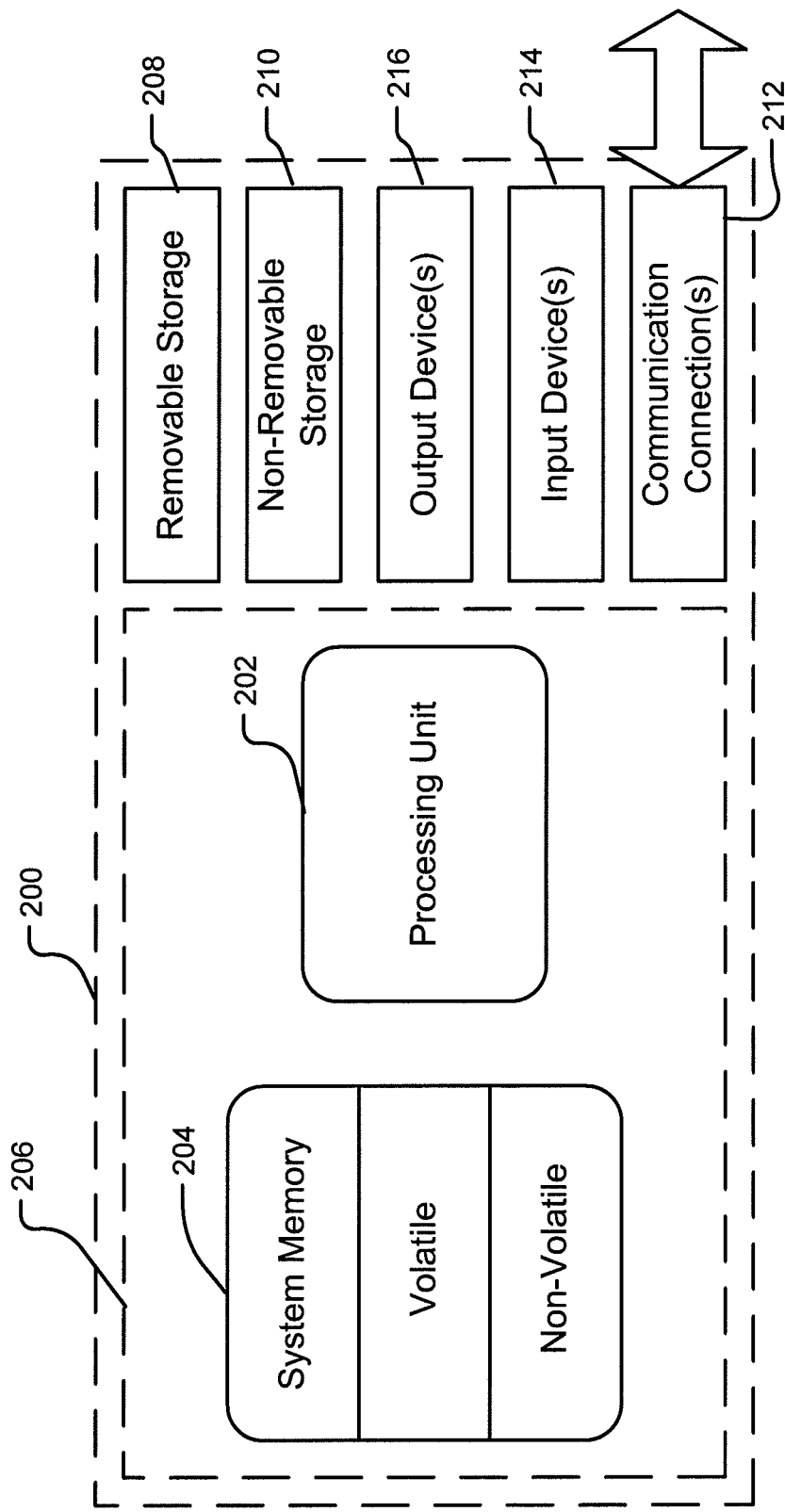
FIG. 2 illustrates an example of a suitable computing system environment on which exemplary embodiments may be implemented.

FIG. 2 illustrates an example of a suitable computing system environment 200 on which embodiments of the invention may be implemented. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, system 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 200. Any such computer storage media may be part of system 200.

System 200 may also contain communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

System 200 also includes input devices 214 such as a keyboard, mouse, pen, voice input device, touch input device, etc. Output device(s) 216 such as a display, speakers, printer, etc. may also be included. All these devices are well known in the art and need not be discussed at length here.

A computing device, such as system 200, typically includes at least some form of computer-readable media. Computer-readable media can be any available media that can be accessed by the system 200. By way of example, and not limitation, computer-readable media may comprise computer storage media and/or communication media, as described above.

Figure 3:
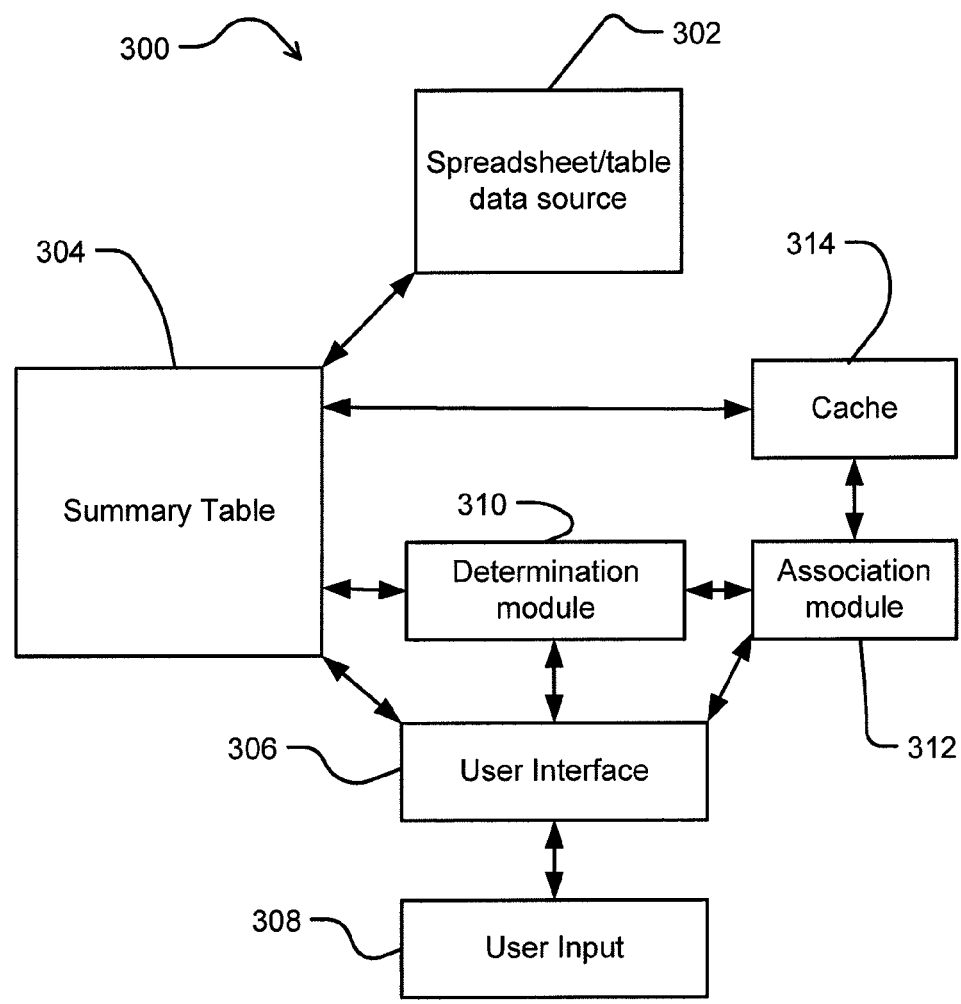
FIG. 3 is a block diagram illustrating a system for associating conditions with data points in a summary table, according to an exemplary embodiment.

FIG. 3 illustrates a system 300 for associating conditions to data points in a summary table. System 300, in this embodiment, includes a spreadsheet, table or data source at 302, as well as a summary table 304, which is coupled to data source 302, to receive information there from. System 300 also includes a user interface 306, which is coupled to the summary table 304 and user input 308. The user input 308 may utilize user interface 306 to enter data, selections, commands, create new conditional formats and/or combinations thereof, etc.

Within summary table 304 there may be one or more selected cells. Once cells have been selected and an "active cell" has been determined as described above, a determination module 310 determines related data points to those selected data points, as well as data point groups related to the active cell. Furthermore, in an embodiment, determination module 310 also preferably determines which commands (including the command to add a new conditional format) and/or rules may be applied to the selected data points and the related data points, and further sends the commands to the user interface 306 to be displayed.

The displayed commands and data points may then be selected by user input 308 via user interface 306. If the user chooses a command to add a new conditional format, information about the condition (e.g. the condition type, parameters, associated formatting) and selected data points are then sent to association module 312 via the determination module 310 and/or the user interface 306. In one embodiment, association module 312 is configured to associate the condition specified by the user with the selected data point(s). Furthermore, association module 312 may be configured to send and save that information to cache 314 such that the saved condition and associated data points may be utilized by the summary table 304. Alternatively, cache 314 may be configured to save the information for future display within the summary table 304. While the association module 312 is shown in the illustrated embodiment as being separate from the spreadsheet or data source 302, in an alternative embodiment of the present invention the association module 312 may be a part of the spreadsheet or other data source 302, or the association module 312 may be included within another portion of the system 300.

In this manner, conditional formats and associated data points may be saved such that when the particular data points are moved within the summary table 304, or removed from the display, the conditions remain associated with the data points. Furthermore, the cache 314 may be saved along with the summary table 304 such that when the summary table 304 is used again, or the data points are redisplayed, the conditional formats associated with the data points may still be displayed and configured. Typically, all components reside on one computer; however, one or more portions of system 300 may reside on separate computers, in separate locations, accessible via networks, etc., without deviating from the concepts disclosed herein.

Figure 4:
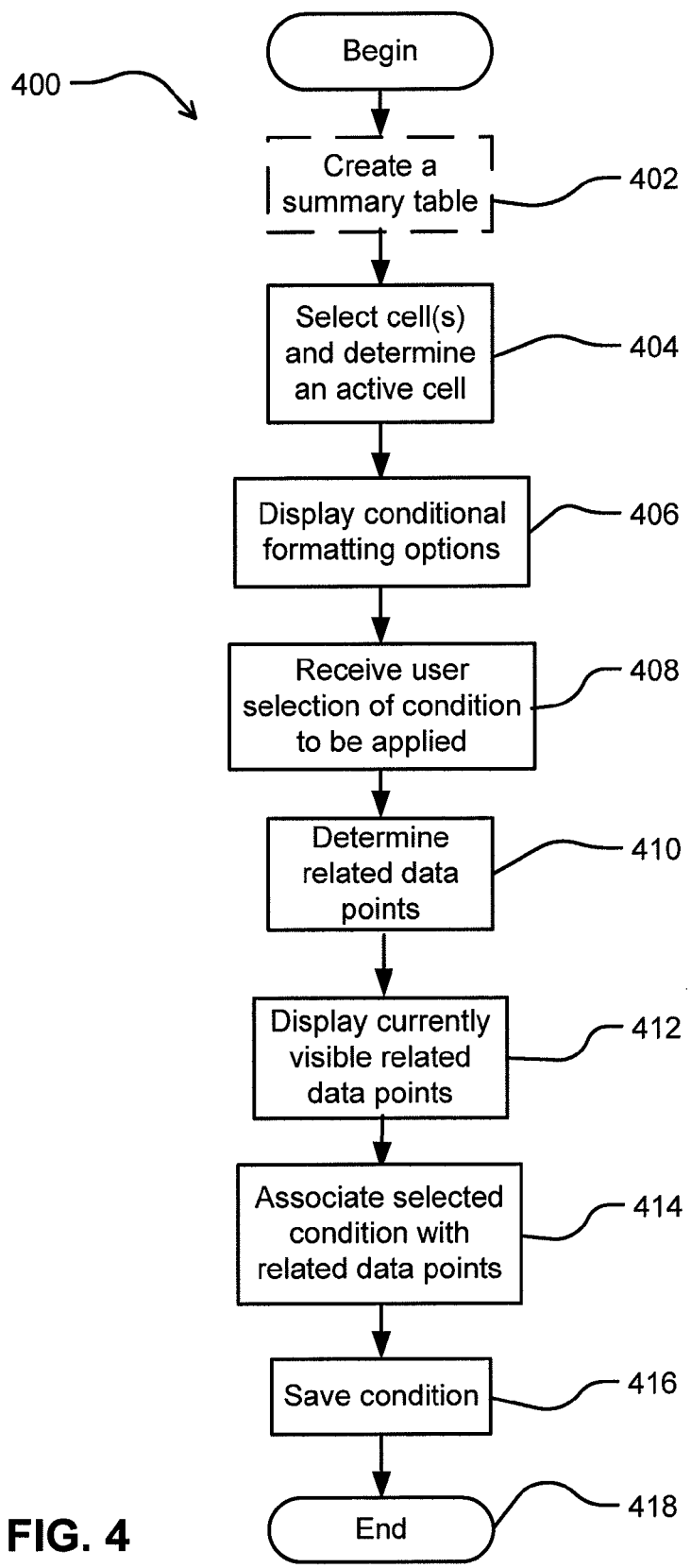
FIG. 4 is a flow diagram illustrating a method of adding conditions to a summary table, according to an exemplary embodiment.

FIG. 4 illustrates one embodiment of a method 400 for associating conditions with data points in a summary table. Method 400 begins with creation step 402, which creates a summary table. It will be appreciated that the step 402 of creating a summary table is optional in that associating conditions with data points may be done with a previously created summary table, as well as a newly created summary table. Included in creating a summary table is the step of linking a spreadsheet and/or other data source with the summary table. The summary table utilizes the information from the spreadsheet or other data source for inclusion in the summary table.

Next, selection operation 404 includes the step of selecting one or more cells. A cell may be selected in many different ways, including clicking, double clicking, clicking and dragging, using keyboard arrow keys, etc. Selection operation 404 also includes the step of determining an "active cell" as described above (e.g., determining a top left cell within the selected cells).

In one embodiment, the method 400 includes a display operation 406 where potential conditional formatting options are displayed to a user. As described below with respect to FIG. 6, this display operation 406 may take the form of displaying a conditional formatting toolbar 600 providing various condition types that may be applied to the specified data points. A user then selects the appropriate condition (i.e., chooses a desired conditional formatting option) to associate with the selected data points in operation 408.

Once one or more cells have been selected and a conditional format has been selected in operation 408, control passes to determine operation 410 to determine or identify related groups of data points. The system identifies related data points and groups of data points based upon the cells selected and/or the data field within the "active cell." The related groups of data points may include only the data points in the highlighted cells, data points displaying numbers from the same data field as the active cell, and/or all data points where the same set of fields intersect as in the active cell. One embodiment of the determine operation 410 is described below with respect to FIGS. 5A-5C. Once the related data points have been determined in step 410, display operation 412 actually selects and displays the related groups of data points via the user interface. In one embodiment, display operation 412 only displays a selection of the related data points that are currently visible in the summary table.

The selected condition is actually associated with the previously specified data points or groups of data points in association operation 414. In particular, following the association operation 414, the condition remains associated with the selected data points throughout the summary table, even when the data within the summary table is reorganized so that the selected data points occupy different cells within the table. Furthermore, the condition remains associated with the selected data points even when the data points are not currently displayed in the reorganized summary table. Thus, when a currently non-displayed data point has a conditional formatting rule associated with it, the conditional format will be still applied when the data point is later displayed (i.e., following a reorganization of the summary table).

Finally, save operation 416 saves the conditions with the associated data points, typically to a cache 314 which is associated with the summary table 304, as illustrated in FIG. 3. In one embodiment, the data points are saved via coordinates or broader scoping information such as a data field or a set of intersecting fields, along with the conditions. Ranges of data are also stored in this manner. Therefore, when a summary table is closed and later reopened, the conditions are still associated with the data points such that the display will indicate the proper conditional formatting. Furthermore, if a user manipulates the summary table (i.e., by moving or reorganizing the columns and rows that contain the data points), the condition and/or formatting rules will still be applied to the appropriate data points, as opposed to being applied to the static summary table cells that originally contained the data points. In an embodiment, the selected data points may be saved as individual data points or may be saved via field descriptors or other method, as desired. Once the conditions have been saved, the method ends at 418.

Figure 6:
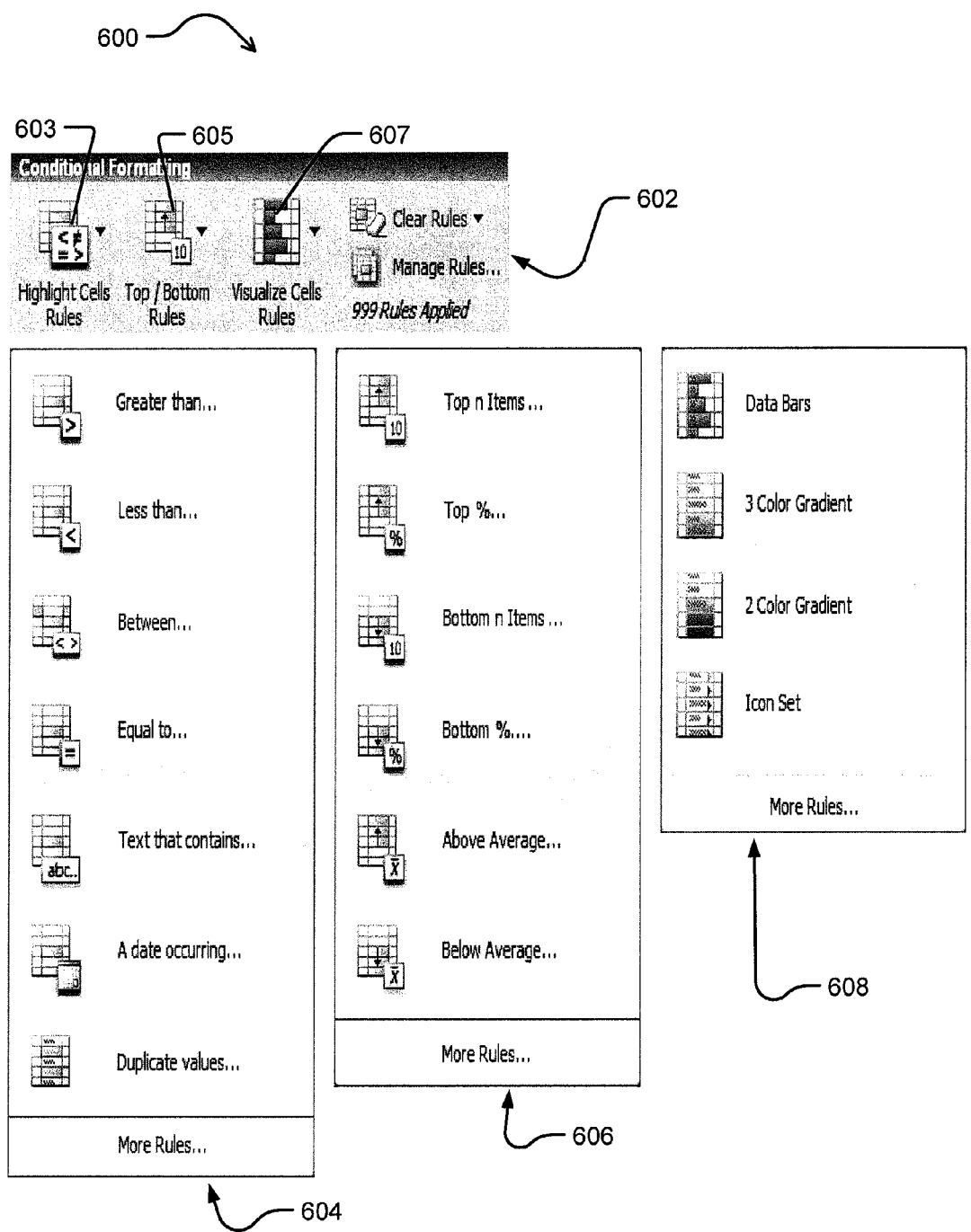
FIG. 6 illustrates operational characteristics involved in presentation of conditions that may be applied to the data points, according to an exemplary embodiment.

FIGS. 5A-5C show a portion of a screen display 500 illustrating a summary table 502 having a "profit" data field 504 arranged similar to the data field 106 described in FIG. 1. Summary table 502 in this embodiment includes a plurality of selected cells as shown at 506 and indicated by border 508. In one embodiment, after a user has made an initial selection of the cells 506, the user next preferably selects a conditional format to apply to the selected cells (e.g., by clicking on an icon within a toolbar 600, as shown in FIG. 6, or by using other known methods to generate a conditional formatting dialog window). Once a conditional format has been applied to the originally selected cells 506, an icon and/or indicator 510 preferably appears in one embodiment of the invention, as shown in FIG. 5A. Upon clicking on or otherwise activating the indicator 510, a user may expand the set of data points to be associated with the condition (as opposed to the default action of applying the condition to just the selected data points). In one embodiment, clicking the indicator 510 opens a related data selection interface window 512, as shown in FIG. 5B.

FIG. 5B illustrates the same screen display 500 of FIG. 5A following activation of the indicator 510 and display of the data selection interface window 512. In the example shown, the data selection interface window 512 illustrates three different groups of data points that may be selected based upon the data points in the selected cells 506. In particular, the conditional format may be associated to just the selected cells, all profit cells, or all cells where the same set of fields intersect as in the active cell (i.e., the top cell of the selected cells 506).

FIG. 5C illustrates the same screen display 500 of FIGS. 5A and 5B after additional data points have been selected as a result of choosing the third option from FIG. 5B, namely, "all profit cells with the same fields." This is the same set of currently visible data points where the fields Profit, Country, State_Province, Year and Quarter intersect. The newly selected cells are indicated by a hatched line or "dancing ants" border 514, although, in one embodiment, the relatively dark border 508 remains positioned about the originally selected cells 506 (FIG. 5B). The newly highlighted cells and border 514 indicate to the user the selected related data points to which the conditional formatting is now associated. Additionally, other currently non-displayed data points may also be affected by the expanded selection of the related data points shown in FIG. 5C (i.e., the conditional formats may also be applied to these currently non-displayed data points, such that the conditional formats will be indicated when the currently non-displayed data points are ultimately displayed as a result of modifying the summary table).

FIG. 6 illustrates one embodiment of a conditional formatting selection user interface or toolbar 600 which is configured to allow a user to select different conditions to apply to the data points selected in FIGS. 5A-5C. In the exemplary embodiment, user interface 600 includes a list 602 of condition types (e.g., toolbar icons) that a user may select to associate with the selected data points. In an embodiment, user interface 600 includes a first icon 603 relating to a first set of formatting rules as shown in the drop down menu 604. The first set of rules shown in the menu 604 allow a user to define general conditional formatting rules, such as values that are equal to a certain number, within a range between a high and a low value, or simply greater than or less than a threshold value. It will be appreciated that numerous other condition types may be included within the menu 604 (as denoted by the "More Rules . . . " option at the bottom of the menu), and that this type of condition may be utilized in different manners within the scope of the present invention.

A second icon 605 within the exemplary embodiment of the user interface 600 provides access to a second drop down menu 606 where a user may access additional condition types, namely "top/bottom" rules that apply conditional formatting to the highest or lowest values in an identified range of data items (e.g., top ten, top five percent, bottom twenty percent, above average, etc.).

In an embodiment, a third icon 607 provides access to additional condition types contained in a further drop down menu 608. This menu 608 contains options for visualizing or highlighting the different data points according to their relative values. Thus, different colors, icons or data bars may be applied to the data points according to the specific conditional formatting rule selected by the user. For example, a user may configure a "3 color gradient" condition to apply a green gradient to data entries that are in the top twenty percent of the selected data items, and a red gradient to the bottom thirty percent of the selected data entries.

Figure 7:
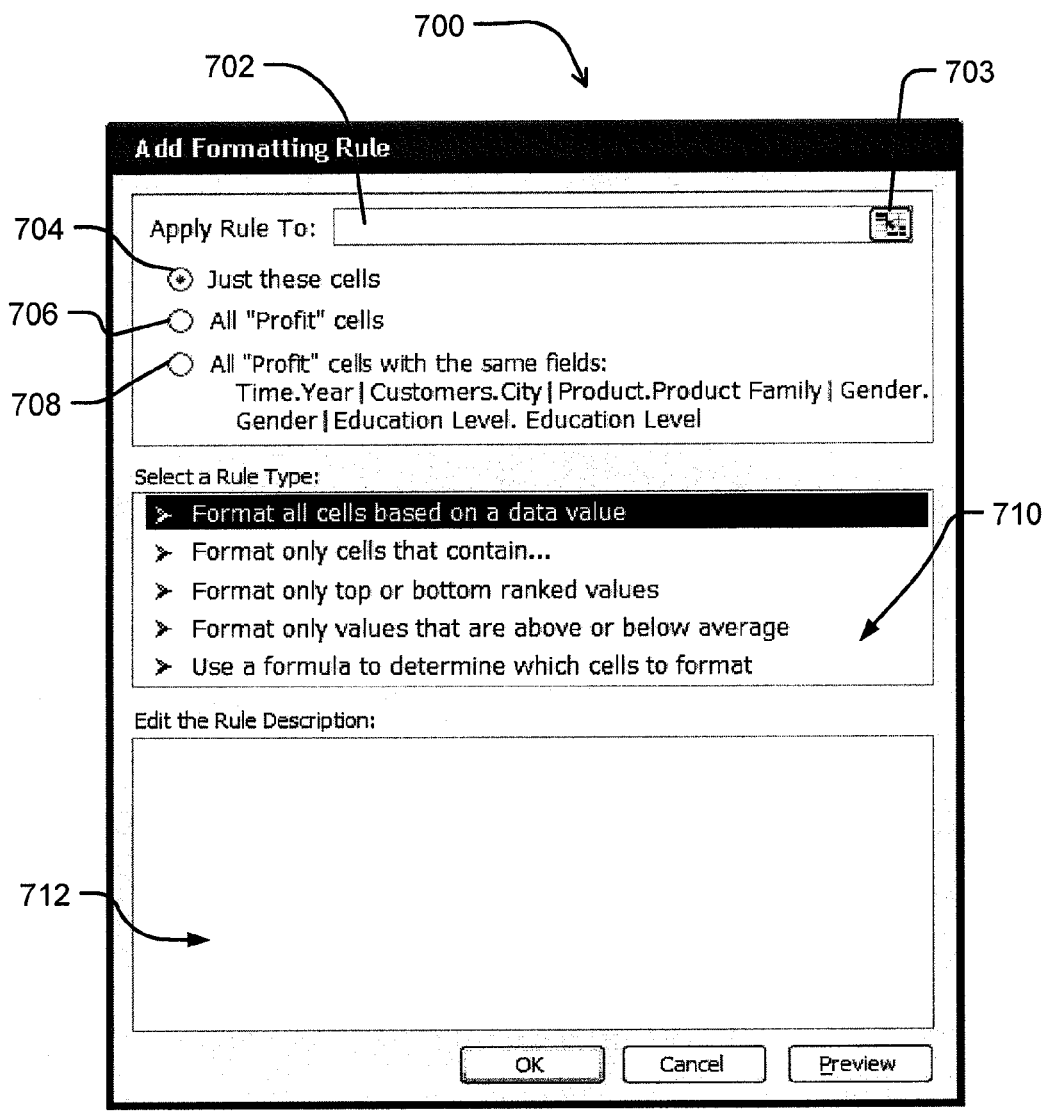
FIG. 7 illustrates operational characteristics involved in an alternative presentation of different conditions to apply, and related groups of data points to which the conditions are to be applied, according to an exemplary embodiment.

FIG. 7 shows an alternative user interface 700 for selecting data points, as well as adding conditional formats to be associated with the selected data points. The user interface 700 differs HI from the interface shown in FIGS. 5 and 6 in that the user interface 700 allows a user to first choose the "related" cells and then apply a particular conditional format to the selected cells. Thus, utilizing the interface 700, a user may alter the order of the operations presented in FIG. 4, as described below.

In one embodiment, user interface 700 includes a data point identifier portion at 702, which would allow the user to directly select the fields and/or data points to be utilized, either by typing a range within the text box or by clicking the icon 703 to allow the user to select the cells directly on the spreadsheet. Additionally, the data identifier portion 702 also preferably includes radio buttons 704, 706 and 708 for identifying related data points and/or groups, as shown in FIG. 7. In particular, if the user chooses to apply the conditions only to the selected cells, radio button 704 would be activated. If the user elects to associate the conditional format with the data field in which the active cell is located (e.g., all the "profit cells"), the user would select the radio button 706. Finally, if the user elects to apply the conditional format to all the data entries that fall within the same intersection of fields as the active cell, the user would select the radio button 708.

In the exemplary embodiment shown in FIG. 7, the user interface 700 also includes a command selection portion 710 in which the user may build a conditional formatting rule to be applied and/or associated with the selected data points and/or groups from above. The conditional formatting rule is preferably built by selecting one or more condition types in the portion 710 and displaying those selections in edit portion 712, thereby allowing a user to directly configure certain variables that define the condition type. Once the conditional formatting rule has been completed in the edit portion 712, the "OK" button is selected to associate and save the condition with the selected data points (as opposed to just a static range of cells within the table or summary table). Thus, the user interface 700 allows a user to first select and determine the "related" cells, and then apply a conditional format to those cells. This operational sequence is similar to the embodiment shown in FIG. 4, with the difference being that operations 410 and 412 may occur prior to operations 406 and 408 when the user interface 700 is utilized.

The logical operations of the various exemplary embodiments may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the exemplary embodiments described herein are referred to variously as operations, structural devices, acts or modules. It will be recognized by one skilled in the art that these operations, structural devices, acts and modules may be implemented in software, in firmware, in special purpose digital logic, and/or any combination thereof without deviating from the spirit and scope of the present disclosure as recited within the claims attached hereto.

Although the exemplary embodiments have been described in language specific to computer structural features, methodological acts, and by computer readable media, it is to be understood that the exemplary embodiments defined in the appended claims are not necessarily limited to the specific structures, acts or media described. As an example, different modules may be utilized to receive the selected conditional formats and groups of data entries, and to associate the two. Therefore, the specific structural features, acts and mediums are disclosed as exemplary embodiments implementing the claimed invention.

The various embodiments described above are provided by way of illustration only and should not be construed to limit this disclosure. Those skilled in the art will readily recognize various modifications and changes that may be made to the present disclosure without following the exemplary embodiments and applications illustrated and described herein, and without departing from the true spirit and scope of the present disclosure, which is set forth in the following claims.

What is claimed is:

1. A method, performed by a processor, for associating a formatting condition with related data points in a summary table, the method comprising:
receiving a selection of one or more cells in the summary table, wherein the summary table includes data;
determining, by the processor, an active cell in the selection of one or more cells, wherein the active cell comprises an active data point, and wherein the active data point comprises an associated data field;
receiving a selection of a condition to be associated with at least the active data point;
associating the selected condition with the active data point;
displaying the active data point with the associated condition;
rearranging the data in the summary table, wherein the active data point moves to a second cell in the summary table; and upon the active data point moving to the second cell, maintaining the association between the selected condition and the active data point.

2. The method of claim 1, further comprising, displaying one or more potential conditional formatting options to a user.

3. The method of claim 2, wherein the selection of the condition to be associated with at least the active data point is selected from the one or more potential conditional formatting options displayed to the user.

4. The method of claim 1, further comprising saving the selected condition with the active data point.

5. The method of claim 4, wherein the active data point is saved via scoping information, wherein the scoping information is usable to determine a set of data points associated with the condition.

6. The method of claim 1, further comprising:
determining one or more related data points relating to the active data point, and
associating the selected conditional format with the active data point and the related data points.

7. The method of claim 6, further comprising displaying the one or more related data points with the selected condition.

8. The method of claim 1, further comprising:
hiding from display the active data point with the associated condition; and
continuing to associate the selected condition with the active data point.

9. A system for associating a formatting condition with related data points in a summary table, the system comprising:
a processor; and
a memory, wherein the memory stores instructions executed by the processor, the memory comprising:
a summary table, wherein the summary table comprises data and a plurality of cells;
instructions for receiving a selection of one or more cells in the summary table;
instructions for determining an active cell in the selection of one or more cells, wherein the active cell comprises an active data point, and wherein the active cell data point comprises an associated data field;
a determination module, wherein the determination module determines one or more related data points related to the active data point;
instructions for receiving a selection of a condition to be associated with at least the active data point;
instructions for associating the selected condition with the active data point and the one or more related data points;
instructions for rearranging the data in the summary table, wherein the active data point moves to a second cell in the summary table; and
instructions for, upon the active data point moving to the second cell, maintaining the association between the selected condition and the active data point in the second cell; and
a user interface, wherein the user interface displays the active data point with the selected condition.

10. The system of claim 9, further comprising a cache, wherein the cache saves the selected condition with the active data point.

11. The system of claim 9, wherein the determination module determines that rules may be applied to the active data point and the one or more related data points.

12. The system of claim 9, wherein the one or more related data points have the same associated data field as the active data point.

13. The system of claim 9, wherein the memory further comprises instructions for associating the selected condition with the active data point when the active data point is not displayed.

14. A computer storage medium having computer-executable instructions that, when executed by a processor, perform a method of applying a conditional format to a summary table, the method comprising:
receiving a selection of one or more cells in the summary table;
determining an active cell in the selection of one or more cells, wherein the active cell comprises an active data point, and wherein the active data point comprises an associated data field;
determining one or more related data points relating to the active data point;
receiving a selection of a conditional format to be associated with at least the active data point;
associating the selected conditional format with the active data point and the related data points;
displaying the active data point with the selected condition;
rearranging the data in the summary table, wherein the active data point moves to a second cell in the summary table; and
upon the active data point moving to the second cell, maintaining the association between the selected conditional format and the active data point in the second cell.

15. The computer storage medium of claim 14, further comprising displaying the one or more related data points with the associated condition.

16. The computer storage medium of claim 14, further comprising displaying a user interface which is configured to allow a user to select a different condition to apply to the selection of one or more cells.

17. The computer storage medium of claim 16, wherein the user interface is displayed upon receiving a user selection of an indicator in the summary table.

18. The computer storage medium of claim 14, wherein the one or more related data points have the same associated data field as the active data point.

* * * * *